Jan. 1, 1963  R. H. ORTER  3,070,809
FLUSH VALVE FOR WATER CLOSETS
Filed Nov. 2, 1961  5 Sheets-Sheet 1

INVENTOR.
RALPH H. ORTER
BY
Wm. H. Dean
AGENT

Jan. 1, 1963   R. H. ORTER   3,070,809
FLUSH VALVE FOR WATER CLOSETS
Filed Nov. 2, 1961   5 Sheets-Sheet 2

INVENTOR.
RALPH H. ORTER
BY
Wm. H. Dean
AGENT

Jan. 1, 1963 R. H. ORTER 3,070,809
FLUSH VALVE FOR WATER CLOSETS
Filed Nov. 2, 1961 5 Sheets-Sheet 3

INVENTOR.
RALPH H. ORTER
BY
Wm. H. Dean
AGENT

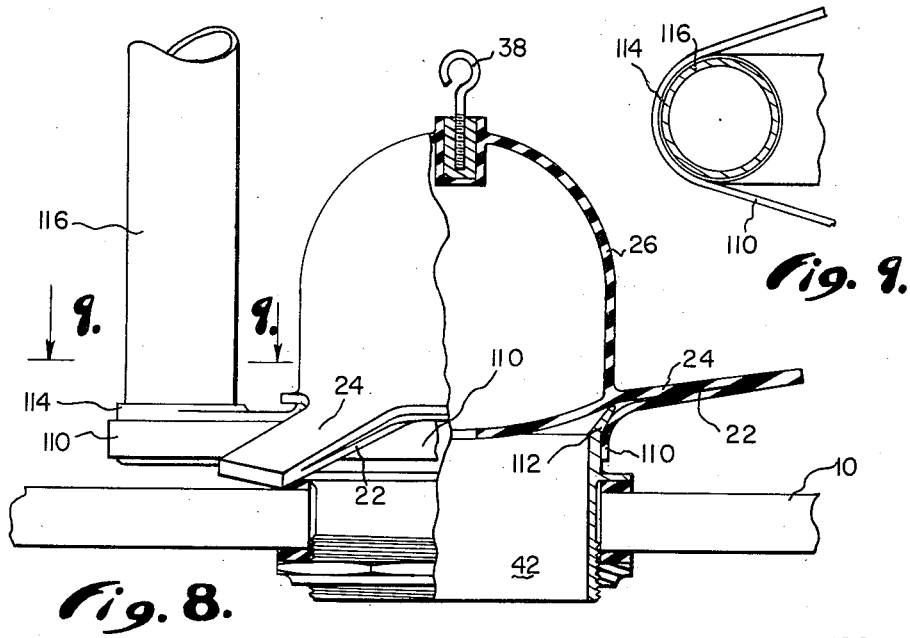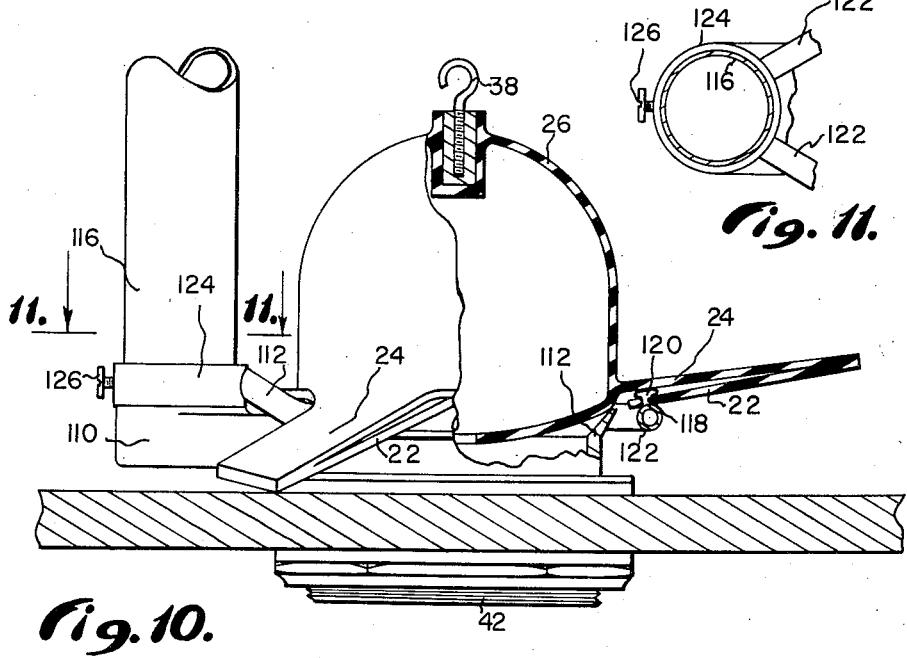

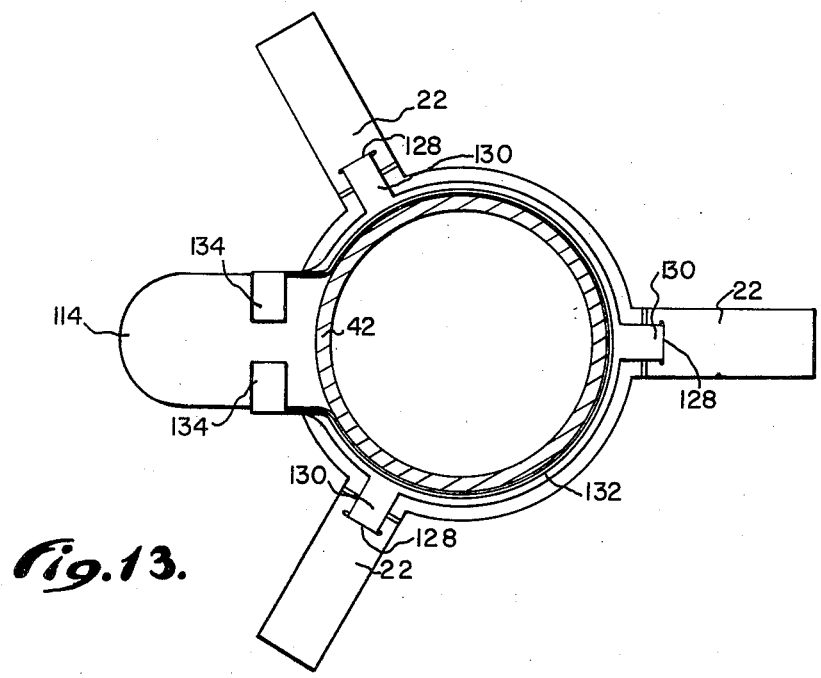

3,070,809
FLUSH VALVE FOR WATER CLOSETS
Ralph H. Orter, 4321 N. 19th Place, Phoenix, Ariz.
Filed Nov. 2, 1961, Ser. No. 149,774
10 Claims. (Cl. 4—57)

This invention relates to a flush valve for water closets and more particularly to a flush valve for water closets having means for centering the flush valve relative to a discharge opening near the bottom of a water closet flush tank. The present application is a continuation in part of my co-pending application for Flush Valve for Water Closets, Serial Number 858,950, filed December 11, 1959, now abandoned.

Conventional water closets for toilets generally utilize a substantially spherical shaped valve made of resilient material which cooperates with an annular seat at the upper end of a discharge pipe. Proper seating for such valves has been a constant problem due to the fact that these valves are suspended and do not always center themselves with respect to the discharge seat whereby they leak and waste water.

Accordingly, it is an object of the invention to provide a flush valve for water closets having means which may readily and easily be installed in connection with the upper end of a conventional water closet discharge pipe and which automatically centers itself effectively to provide an enclosure therefor whereby leakage and water waste is held to a minimum.

Another object of the invention is to provide a flush valve for water closets having a resilient collar which is peripherally engaged on the upper end of a water closet discharge pipe and which comprises a plurality of radially directed resilient fingers which are coupled to a valve concentrically of the upper end of the discharge pipe whereby upward deflection of the resilient fingers permits the valve to be moved to open position relative to the upper end of the discharge pipe and whereby the fingers, when the valve is released, guide the valve into concentric and proper seating position at the upper end of the discharge pipe.

Another object of the invention is to provide a flush valve for water closets having resilient seat means which is peripherally engaged with the upper end of a conventional water closet discharge pipe and whereon a valve is seated whereby the valve is provided with a smooth seat even though the upper end of the discharge pipe may be corroded or eroded.

Another object of the invention is to provide a flush valve for water closets having means which may readily be placed around and firmly engaged with the upper peripheral portion of a conventional water closet discharge pipe and which carries centering means radially extended therefrom and adapted to support a flush valve concentrically with the seat.

Another object of the invention is to provide a flush valve for water closets having resilient means engaging the periphery of a conventional water closet discharge tube, said means having integral radially disposed fingers which are resilient and which are coupled to superimposed fingers of resilient material integral with a valve member positioned concentrically above the upper end of the water discharge pipe whereby the superimposed radially extended resilient fingers are separable when the valve is moved upwardly to open position relative to the end of the pipe and the resilient superimposed fingers maintain concentricity of the valve relative to its seat when in open or closed position.

Another object of the invention is to provide a flush valve for water closets having means for securing and centering the valve on a discharge pipe of a water closet and wherein a combined washdown and overflow tube communicates with the interior of said means in order to conduct overflow and washdown water through the discharge pipe.

Another object of the invention is to provide a flush valve for water closets comprising a band of resilient material disposed resiliently to surround the upper flange end of a water closet discharge pipe and a overflow pipe fixture adjacent thereto for supporting and centering a flush valve over the open end of the discharge pipe.

Another object of the invention is to provide a flush valve for water closets having novel means for supporting the same in alignment with and concentric with a water discharge pipe by securing a bracket on an adjacent overflow pipe and thereby supporting the flush valve in alignment with the discharge pipe.

Further objects and advantages of the invention may be apparent from the following specification, appended claims and accompanying drawings in which:

Figure 1:
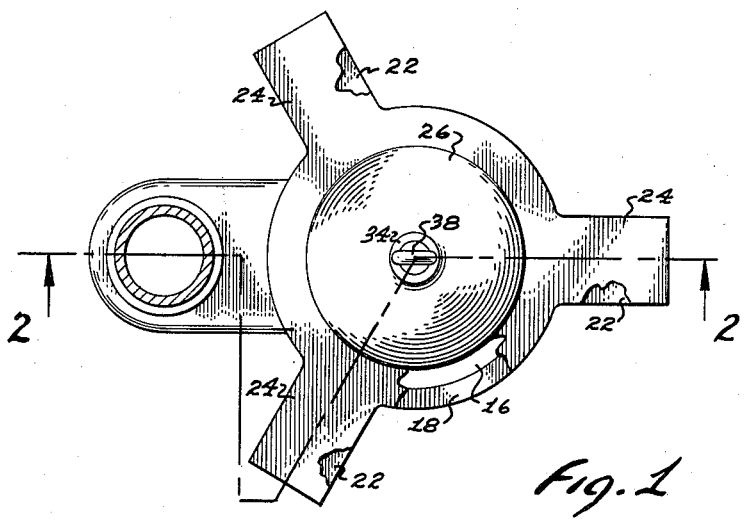
FIG. 1 is a top or plan view of a flush valve for water closets in accordance with the present invention and showing a conventional water overflow pipe in section.
Figure 2:
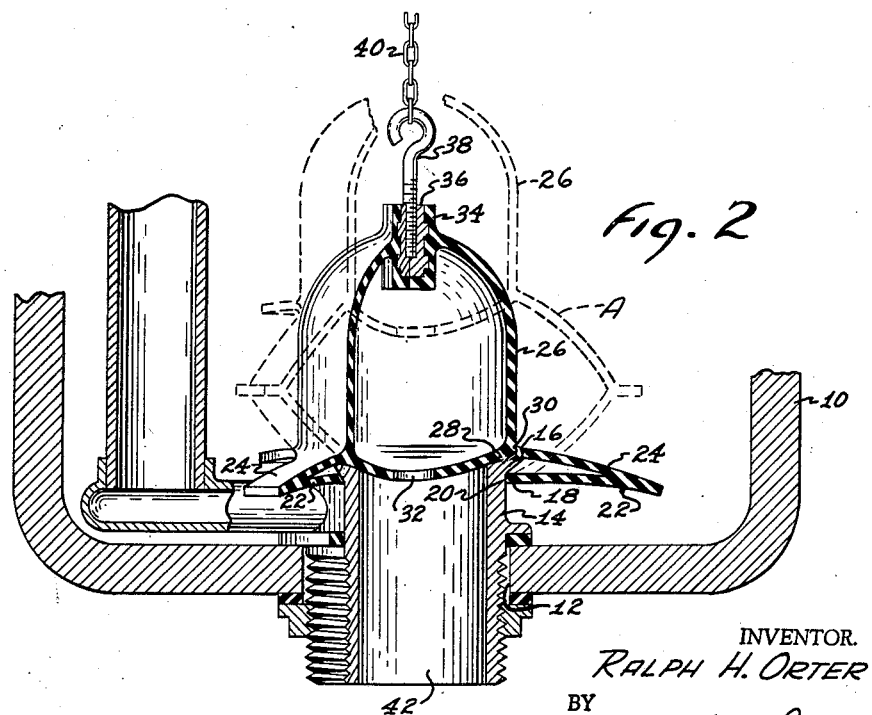
FIG. 2 is a fragmentary sectional view taken from the line 2—2 of FIG. 1 and showing features of a water closet tank in connection therein and illustrating by broken lines a varying position of the flush valve of the invention.
Figure 6:
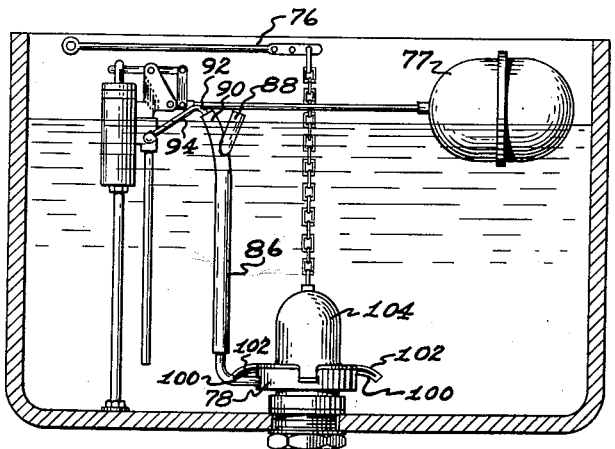
FIG. 6 is a vertical sectional view of a water closet tank showing a further modification of the present invention and comprising a valve seat element coupled to the upper end of the water closet discharge pipe and providing a passage for a combined overflow and washdown tube below the seat of the flush valve of the present invention.
Figure 7:
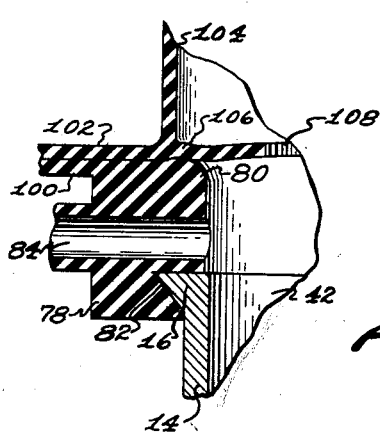

FIG. 7 is an enlarged fragmentary sectional view of the structure shown in FIG. 6 of the drawings and illustrating a passage for the combined overflow and washdown tube communicating with the discharge tube below the valve seat; and FIG. 8 is a view similar to FIG. 2 but showing another modified form of the invention comprising a resilient band for surrounding the upper end of a flush tank discharge pipe and also for surrounding an overflow pipe fitting whereby the flush valve is held concentrically in alignment with the open end of the discharge pipe;

FIG. 9 is a fragmentary sectional view taken from the line 9—9 of FIG. 8;

FIG. 10 is another view similar to FIG. 8 showing a further modification of the invention wherein the flush valve is supported by a bracket secured to the overflow pipe;

FIG. 11 is a fragmentary sectional view taken from the line 11—11 of FIG. 10;

FIG. 12 is another view similar to FIG. 8 but showing a still further modification of the invention comprising a semi-rigid resilient clip secured to the upper end of the discharge pipe and having resilient fingers of a flush valve similar to that as shown in FIG. 2 of the drawings connected to the semi-rigid member for supporting the flush valve in concentric relationship with the open outlet end of the discharge pipe; and FIG. 13 is a fragmentary sectional view taken from the line 13—13 of FIG. 12.

As shown in FIG. 2 of the drawings, a conventional water closet tank 10 is provided with an opening 12 through which a conventional discharge tube 14 extends. This discharge tube 14 is provided with an angular and annular flange 16 which is engaged by the flush valve structure of the present invention.

The flush valve of the present invention is provided with an annular ring 18 which is made of resilient material such as rubber. This ring 18 is resiliently engaged with the outer side of the discharge tube 14 below the flange 16. The ring is provided with a central opening 20 which is stretchable to permit it to be placed over the flange 16 and in engagement with the outer side of the discharge tube 14. Integral with the ring 18 are resilient fingers 22 which extend radially and are disposed substantially 120 degrees apart. It will be apparent that while the present structure comprises only three of these fingers 22, more or less of them may be provided as desired.

Integral with the outer ends of these fingers are superimposed fingers 24 which are also integral with a hollow valve member 26 which is provided with a seat portion 28 on its lower surface. This seat portion 28 is annular and is complemental to an annular seat surface at the upper end of the discharge tube 14. Thus the upper end of the discharge tube 14 forms an annular seat 30 for the annular seat portion 28 of the valve structure 26.

Concentrically with the seat 28, the valve is provided with an opening 32 while the upper end of the valve is provided with an integral hub 34 in which a fixture 36 is cast and wherein an eye bolt 38 is screwthreaded, all as shown best in FIG. 2 of the drawings. Secured to this eye bolt 38 is a chain or cord 40 utilized for a normal actuation of the valve.

In operation the present invention comprises a novel function of centering the valve element relative to the annular seat 30 at the upper end of the discharge tube 14. The fingers 22 and 24 are deflectable into a broken line position A permitting the seat 28 to be raised upwardly into spaced relationship with the seat 30 whereby water may flow between the fingers 24 and outwardly through the bore 42 of the discharge pipe 14. The valve body 26 is forced into the broken line A by tension on the chain 40 and when released, the flow of water and gravity causes downward movement of the valve body 26 so that its seat 28 engages the seat 30 on the upper end of the discharge tube 14.

During the downward movement of the valve body 26, the fingers 22 and 24 center the seat relative to the seat 30. Thus the valve always closes normally with the proper seating action and prevents leakage outwardly through the discharge tube 14.

It will be obvious to those skilled in the art that the ring 18, hereinbefore described, may readily be placed over the annular flange 16 and engaged with the outside of the discharge tube 14 whereby the valve of the present invention is concentrically located relative to the discharge tube and whereby all of the resilient features of the fingers permit proper actuation of the valve with a minimum amount of force applied to the chain 40.

It will be further understood by those skilled in the art that all of the features of the valve and its guiding fingers may be molded in a very simple fashion.

The valve of the present invention may readily be adapted to a conventional discharge tube by a layman whereby the present and most usual ball-type valves may be replaced by the valve of the present invention.

Figure 3:
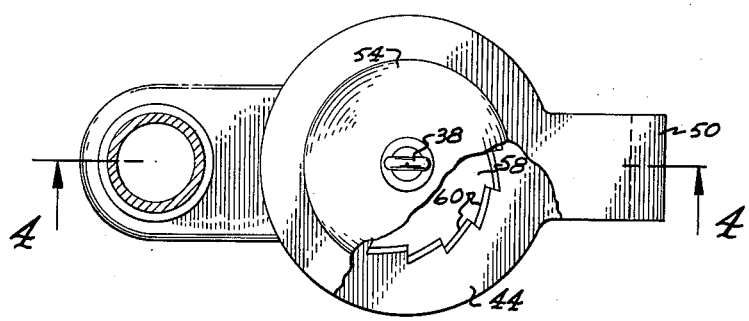
FIG. 3 is a top or plan view of a modification of the present invention showing a conventional overflow pipe in section and showing portions of the valve broken away to amplify the illustration.
Figure 4:
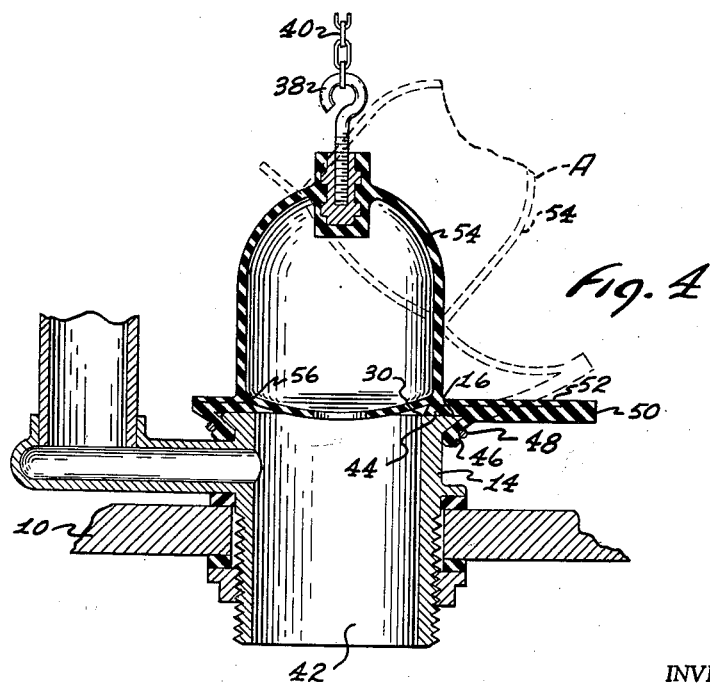
FIG. 4 is a sectional view taken from the line 4—4 of FIG. 3 showing portions of a water closet tank in section and illustrating by broken lines an open position of the flush valve.

As shown in FIGS. 3 and 4 of the drawings, the modification of the invention comprises an annular resilient valve seat element 44 which is provided with an annular lip 46 which fits over a conventional flange 16 of the discharge tube 14 in a conventional flush tank 10.

Surrounding the lip 46 is a wire ring 48 to provide additional holding force to retain the resilient ring seat 44 in place over the upper end and seat 30 of the discharge tube 14. The resilient ring 44 is provided with an extending finger 50, integral with which is another finger 52, integral with a valve body 54 similar to the valve body 26, hereinbefore described. It will be seen that the valve body 54 may be actuated upwardly by the chain 40 into a broken line position A and that the resilient structure of the superimposed fingers 50 and 52 permits resilient and pivotal movement of the structure so that the valve body 54 exposes the upper open end of the discharge tube 14.

It will be seen that the resilient ring 44 provides a replacement seat for the upper end of the discharge tube 14 so that in the event the seat 30 is badly worn or corroded, the resilient ring 44 becomes the seat for the valve body 54 at its seat portion 56. Thus the upper surface of the resilient ring 44 forms a contacting seat for the lowermost seat portion of the valve body 54.

The resilient ring 44 is provided with a central outlet opening 58 having swirl serrations 60 which tend to create a swirl of the water as it gravitates downwardly and outwardly through the discharge tube 14.

The modified structure of the invention as shown in FIGS. 3 and 4 of the drawings, operate substantially as follows:

When force is exerted on the chain 40, the valve body 54 is pulled upwardly and into a slightly lateral position as shown by the broken lines A. This is permitted by the resilient action of the fingers 52 and 50 which are integral with each other at a location spaced laterally of the axis of the discharge tube 14.

The annular lip 46, being resiliently placed over the lip 16, is held tightly by the annular wire ring 48. This ring 48 may or may not be used as desired, depending on the amount of holding force required to retain the resilient ring 44 on the discharge tube 14 and to prevent leakage of water between the lip 46 and the annular flange 16.

Figure 5:
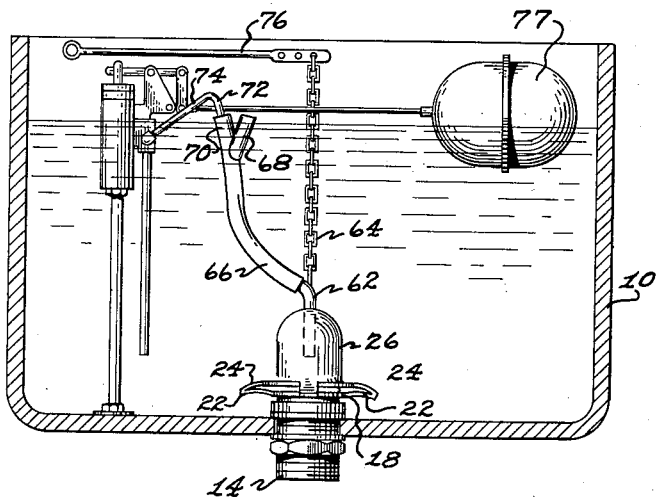
FIG. 5 is a vertical sectional view of a conventional water closet showing a modified form of the flush valve of the present invention therein and showing a combined overflow and washdown tube coupled to the interior of the valve so that it may drain therethrough internally of the seat thereof.

In the modification, as shown in FIG. 5 of the drawings, a resilient ring 18 is integral with radial fingers 22 which are in turn integral with radial fingers 24 which integrally support a valve body 26, all of which is similar to the structure disclosed in FIG. 2 of the drawings.

Communicating with the upper interior of the valve housing 26 is a combined overflow and washdown pipe 62 coupled to a conventional actuating chain 64. Also coupled to the pipe 62 is a flexible section 66 of the pipe 62 having branches 68 and 70 at its upper end. One branch 68 operates as an overflow pipe while the other branch 70 receives a downwardly extending end 72 of a washdown water conducting tube 74.

In operation of the modified structure as shown in FIG. 5 of the drawings, the chain 64 is placed under tension by a conventional actuating lever 76 and this causes the valve body 26 to raise and resiliently spread the fingers 22 and 24, permitting the water to flow between the fingers and into the upper end of the discharge pipe 14.

When the chain is released, the valve concentrically seats, as hereinbefore described, and washdown water passes downwardly through the tube 66 via the tube 74 and branch 70.

When the float valve 77 is elevated by the water to its shut off position, any excess water above the upper end of the branch 68 flows downwardly through the tube 66 and tube section 62 and into the valve body 26 and outwardly through the central opening 32 therein which is similar to the structure shown in FIG. 2 of the drawings.

In the modification as shown in FIGS. 6 and 7 of the drawings, the flange 16 of the discharge pipe 14 is engaged by a collar 78 having an annular seat 80 on its upper portion and an annular notch 82 which fits snugly around the V-shaped flange 16 of the discharge pipe 14. Extending through the collar 78 is a passage 84 which communicates with a combined overflow and washdown water conducting tube 86. This tube 86 is provided with branch conduits 88 and 90 at its upper end. The branch conduit 88 being open at its upper end to receive overflow water while the branch 90 receives a discharge end 92 of a washdown water conducting tube 94.

The collar 78 is provided with radially extending resilient fingers 100 which are integral with superimposed fingers 102. These fingers 100 and 102 are similar to the fingers 22 and 24 hereinbefore described. The valve housing 104, shown in FIG. 7 of the drawings, is similar to the valve housing 26 described in connection with the disclosure of FIG. 2, hereinbefore set forth.

It will be seen that the valve housing 104 is provided with an annular seat portion 106 which engages the annular seat portion 80 on the collar 78 and thereby forms a valve to control flow outwardly between the fingers 102 and downwardly through the bore 42 of the discharge tube 14.

It will be noted that the valve body 104 is provided with an opening 108 which is similar to the opening 32 hereinbefore described in connection with the structure shown in FIG. 2 of the drawings.

In operation, the valve body 104 is actuated with respect to the resilient superimposed fingers 100 and 102 in a similar manner to that of the valve body 26 and its respective superimposed fingers 22 and 24.

The collar 78 serves as a connector for the valve with the discharge tube 14 and also acts by means of the passage 84 as a water overflow conduit and also a water washdown conduit communicating with the tube 86.

In the modification as shown in FIG. 8, the valve body 26 is connected to fingers 24, similar to those shown in FIG. 2 of the drawings, and these fingers 24 are similarly connected to fingers 22 similar to those shown in FIG. 2 of the drawings. These fingers 22 shown in FIG. 8 of the drawings are integral with a resilient band 110 which surrounds the flared portion 112 of the discharge pipe 14. This flared portion 112 is similar to that shown in FIG. 2 of the drawings and provides an upper open end seat portion of the discharge tube for the flush tank 10.

The resilient band 110 partially surrounds the flared portion 112 and also extends around a base portion 114 of a discharge pipe 116 which is substantially axial parallel with the discharge pipe 14 and disposed to extend thereabove and upwardly into the flush tank 10 in the conventional manner. The band 110 provides for simplicity of installation of the conventional flush valve for water closets by reason of the fact that the resilient band 110 may be made of rubber or other similar material and may be stretched over the flared portion 112 of the discharge pipe 14 and over the portion 114 of the overflow means internally of the tank 10. This resilient band 110 greatly simplifies the installation of the flush valve of the invention over discharge pipe 14 in which the flared portion 112 may not be completely machined. In many instances, the flare 112 is not properly machined adjacent to the overflow pipe 114 thus the band 110 extending completely around this structure alleviates the problem of the install- the band 110 around the flare 112 only With the exception of the installation and mounting of the modified structure, as shown in FIG. 8 of the drawings, it operates in a similar manner to the structure as shown in FIG. 2 of the drawings.

In the modification as shown in FIG. 10 of the drawings, the valve body 26 is provided with fingers 24 and 22 similar to those hereinbefore described. However, the fingers 22, as shown in FIG. 10 of the drawings, are provided with openings 118 resiliently engaged over button-like projections 120 on a substantially ring-shaped bracket 122 carried on a collar 124 surrounding the overflow pipe 116. The collar 124 is fixed in position on the pipe 116 by means of a set screw 126. Thus, the substantially ring-shaped portion 122 is held concentrically around the flare portion 112 of the discharge pipe 14.

The ring 122 may be made of metal, plastic or any suitable material while the fingers 22, at their openings 118 may be stretched over the button-like projections 120 and thereby secured in position thereon so that the body 26 properly seats on the open end seat portion of the discharge pipe 14 at its flare portion 112.

With the exception of the supporting of the fingers 22 on the button-like projection portions 120 and the support thereof on the ring 122, the valve body and the fingers 22 and 24 operate in a similar manner to that as shown in FIG. 2 of the drawings.

The collar 124 may be adjusted around the axis of the overflow pipe 116 until the valve body 26 is supported concentrically over the flare 112.

In the modification as shown in FIG. 12 of the drawings, the valve body 26 is provided with fingers 22 and 24 similar to those hereinbefore described, and the fingers 22 are provided with openings 128 which fit over substantially radial projections 130 of an arcuate resilient bracket 132 which is clipped over the flared portion 112 of the discharge tube 14.

This bracket 132 is provided with extending finger portions 134 which clip under the base 110 of the overflow pipe 116. Thus, the opposite ends 134 are angularly disposed and fit under the base 110 in order vertically to hold the bracket 132 in place.

This bracket may be made of metal, plastic or any other suitable material having sufficient resilience to be resiliently clipped over the substantially annular flared portion 112 into a position wherein opposite ends 134 are clipped under the base 110 of the overflow pipe 116.

It will be obvious to those skilled in the art that various modifications of the present invention may be resorted to in a manner limited only by a just interpretation of the following claims.

I claim:

1. In a water closet flush valve the combination of: a water closet discharge tube having an upper open end provided with an enlarged peripheral flange portion; resilient means surrounding and resiliently engaging said tube below said flange portion and having resilient spaced fingers extending radially therefrom; second resilient fingers attached to said first resilient fingers and superimposed relative thereto; and a hollow valve body carried by said second resilient fingers and maintained concentrically relative to said water discharge tube, said fingers resiliently deflectable to permit movement of said valve body relative to the open end of said discharge tube and to permit water to flow outwardly therethrough via a passage area between said fingers.

2. In a flush valve for water closets the combination of: a water closet discharge pipe having an upper open end provided with an enlarged peripheral flange portion; a resilient seat engaged around and below said flange portion and having integral spaced finger means extending laterally thereof; second resilient finger means attached near the extremities of said first resilient finger means; and a hollow valve body carried by said second resilient finger means and disposed engageably and concentrically with said resilient seat at the upper end of said water closet discharge pipe.

3. In a flush valve for water closets the combination of: a water closet discharge pipe having a peripherally flanged upper open end; a resilient seat attached thereto and having integral finger means extending laterally thereof; second resilient finger means attached near the extremities of said first resilient finger means; a hollow valve body carried by said second resilient finger means and disposed concentrically with said resilient seat at the upper end of the water closet discharge pipe, said resilient seat having portions surrounding said peripherally flanged upper end of said discharge pipe and gripping the same for holding said first means securely in position and concentrically on said discharge pipe.

4. In a flush vavle for water closets the combination of: a water closet discharge pipe; a resilient means peripherally engaging and resiliently supported on the normally open end of said discharge pipe; said resilient means having a plurality of radially extending resilient fingers; a second plurality of radially extending resilient fingers superimposed relative to said first mentioned fingers and attached thereto near their extremities; a hollow valve body carried by said second plurality of fingers and supported concentrically of the upper end of said discharge pipe; means having a passage disposed below said valve and communicating with the interior of said discharge pipe; and a combined overflow and water washdown pipe extending upwardly from said passage and said discharge pipe and communicating with a water level thereabove whereby water may flow into said combined overflow and water washdown pipe; and a water washdown tube directed into said combination water washdown and overflow pipe for delivering washdown water thereinto.

5. In a water closet flush valve the combination of: a closet discharge tube having an upper open end provided with annular peripheral means for retaining a flush valve thereon; resilient means surrounding and resiliently engaging said tube at said annular peripheral portion; said resilient means provided with an annular portion engaging the annular peripheral portion of said tube and interlocked therewith to prevent longitudinal displacement of said resilient means axially of said discharge tube; resilient spaced fingers integral with said resilient means and extending radially therefrom; second resilient fingers attached to said first resilient fingers and superimposed relative thereto; and a hollow valve body carried by said second resilient fingers and maintained concentrically relative to said water discharge tube, said fingers resiliently deflectable to permit movement of said valve body relative to the open end of said discharge tube and to permit water to flow outwardly therethrough via a passage area between said fingers.

6. In a water closet flush valve the combintaion of: a closet discharge tube having an upper open end forming a valve seat and provided with annular peripheral means for retaining a flush valve thereon; resilient means resiliently engaging said tube at said annular peripheral means; said resilient means provided with a portion engaging said annular peripheral means of said tube and interlocked therewith to prevent longitudinal displacement of said resilient means axially of said discharge tube; first resilient fingers secured to said resilient means and extending radially therefrom; second resilient fingers attached to said first resilent fingers and superimposed relative thereto; and a hollow valve body engageable with said valve seat and carried by said second resilient fingers and thereby maintained concentrically relative to said water discharge tube, said fingers resiliently deflectable to permit movement of said valve body relative to the open end of said discharge tube and to permit water to flow outwardly therethrough via passage areas between said fingers.

7. In a water closet flush valve the combination of: a closet discharge tube having an upper open end forming a valve seat and provided with annular peripheral means for retaining a flush valve thereon; resilient means resiliently engaging said tube at said annular peripheral means; said resilient means provided with a portion engaging said annular peripheral means of said tube and interlocked therewith to prevent longitudinal displacement of said resilient means axially of said discharge tube; first resilient fingers secured to said resilient means and extending radially therefrom; second resilient fingers attached to said first resilient fingers and superimposed relative thereto; and a hollow valve body engageable with said valve seat and carried by said second resilient fingers and thereby maintained concentrically relative to said water discharge tube, said fingers resiliently deflectable to permit movement of said valve body relative to the open end of said discharge tube and to permit water to flow outwardly therethrough via passage areas between said fingers; an overflow tube means coupled to, axially parallel with and communicating with said discharge tube; a resilient band of said resilient means resiliently gripping and engaged around portions of said annular peripheral means of said discharge tube and said overflow tube means.

8. In a water closet flush valve the combination of: a closet discharge tube having an upper open end forming a valve seat and provided with annular peripheral means for retaining a flush valve thereon; resilient means resiliently engaging said tube at said annular peripheral means; said resilient means provided with a portion engaging said annular peripheral means of said tube and interlocked therewith to prevent longitudinal displacement of said resilient means axially of said discharge tube; first resilient fingers secured to said resilient means and extending radially therefrom; second resilient fingers attached to said first resilient fingers and superimposed relative thereto; and a hollow valve body engagable with said valve seat and carried by said second resilient fingers and thereby maintained concentrically relative to said water discharge tube, said fingers resiliently deflectable to permit movement of said valve body relative to the open end of said discharge tube and to permit water to flow outwardly therethrough via passage areas between said fingers; an overflow tube means coupled to, axially parallel with and communicating with said discharge tube; a resilient band of said resilient means resiliently gripping and engaged around portions of said annular peripheral means of said discharge tube and said overflow tube means; said first resilient fingers integral with said resilient band.

9. In a water closet flush valve the combination of: a closet discharge tube having an upper open end forming a valve seat and provided with annular peripheral means for retaining a flush valve thereon; resilient means resiliently engaging said tube at said annular peripheral means; said resilient means provided with a portion engaging said annular peripheral means of said tube and interlocked therewith to prevent longitudinal displacement of said resilient means axially of said discharge tube; first resilient fingers secured to said resilient means and extending radially therefrom; second resilient fingers attached to said first resilient fingers and superimposed relative thereto; and a hollow valve body engageable with said valve seat and carried by said second resilient fingers and thereby maintained concentrically relative to said water discharge tube, said fingers resiliently deflectable to permit movement of said valve body relative to the open end of said discharge tube and to permit water to flow outwardly therethrough via passage areas between said fingers; said annular peripheral portion comprising a ledge, said resilient means comprising a semi-rigid clip structure engaging said ledge and having separable opposite ends slidable into position around said ledge laterally of the axis of said discharge tube said first fingers connected to said clip structure.

10. In a water closet flush valve the combination of: a water closet tank; an axially vertical discharge tube in the lower portion of said tank and having a valve seat open end extending upwardly thereinto; an overflow tube communicating with said discharge tube and extending thereabove in adjacent relation thereto; valve support means having a collar supported on said overflow tube; a substantially ring-shaped portion of said valve support means secured to said collar and supported thereby; said substantially ring-shaped portion substantially surrounding said valve seat open end of said discharge tube; first resilent fingers supported on said substantially ring-shaped portion, and extending radially outward therefrom; second resilient fingers connected to said first resilient fingers and a valve body carried by said second resilient fingers and disposed to engage said valve seat open end of said discharge tube, said first and second fingers resiliently deflectable to permit movement of said body away from said valve seat open end to permit water to flow between said fingers, under said body and outwardly through said discharge tube; and means for forcing said body upwardly and thereby deflecting said fingers.

References Cited in the file of this patent

UNITED STATES PATENTS

| | | |
|---|---|---|
| 1,102,870 | Carreyn | July 7, 1914 |
| 2,324,084 | Horner | July 13, 1943 |
| 2,706,818 | Graziosi | Apr. 26, 1955 |
| 2,869,141 | Koch et al. | Jan. 20, 1959 |

FOREIGN PATENTS

| | | |
|---|---|---|
| 914,838 | Germany | July 8, 1954 |